(12) United States Patent
Panuski et al.

(10) Patent No.: US 11,543,243 B2
(45) Date of Patent: Jan. 3, 2023

(54) SYSTEM AND METHOD FOR DETERMINING ALIGNMENT FOR RAILWAY WAYSIDE SIGNAL APPLICATIONS

(71) Applicant: Siemens Mobility, Inc., New York, NY (US)

(72) Inventors: Justin Panuski, Pittsburgh, PA (US); Brian Joseph Hogan, Temecula, CA (US); Daniel Spencer, Pittsburgh, PA (US)

(73) Assignee: Siemens Mobility, Inc., New York, NY (US)

( * ) Notice: Subject to any disclaimer, the term of this patent is extended or adjusted under 35 U.S.C. 154(b) by 679 days.

(21) Appl. No.: 16/543,935

(22) Filed: Aug. 19, 2019

(65) Prior Publication Data

US 2021/0055101 A1 Feb. 25, 2021

(51) Int. Cl.
*G01C 9/06* (2006.01)
*B61L 1/18* (2006.01)
*B61L 5/18* (2006.01)
*G01C 17/28* (2006.01)

(52) U.S. Cl.
CPC ............. *G01C 9/06* (2013.01); *B61L 1/181* (2013.01); *B61L 5/18* (2013.01); *G01C 17/28* (2013.01); *G01C 2009/066* (2013.01)

(58) Field of Classification Search
None
See application file for complete search history.

(56) References Cited

U.S. PATENT DOCUMENTS

| | | | | |
|---|---|---|---|---|
| 2,373,465 A * | 4/1945 | Douglass | ............... | B61L 5/1818 |
| | | | | 335/219 |
| 4,574,491 A * | 3/1986 | Vining | ...................... | G01C 9/06 |
| | | | | 33/367 |
| 5,864,304 A * | 1/1999 | Gerszberg | ............... | B61L 29/18 |
| | | | | 246/126 |
| 6,216,985 B1 * | 4/2001 | Stephens | ............... | B61L 23/045 |
| | | | | 246/473 R |

(Continued)

FOREIGN PATENT DOCUMENTS

| | | | | |
|---|---|---|---|---|
| CA | 3029286 A1 * | 1/2018 | ................ | B61L 5/18 |
| WO | 2018004532 A1 | 4/2018 | | |
| WO | WO-2019240795 A1 * | 12/2019 | .............. | B61L 29/04 |

OTHER PUBLICATIONS

PCT International Search Report and Written Opinion of International Searching Authority dated Jul. 28, 2020 corresponding to PCT International Application No. PCT/US2020/031311 filed May 4, 2020.

*Primary Examiner* — Christopher W Fulton

(57) ABSTRACT

A system for determining alignment of a signal includes a light assembly comprising a light source operated by an electronic circuit, a first position sensor configured to measure a geographical direction of the light assembly, a second position sensor configured to measure a tilt angle of the light assembly, and a light communication device configured to receive measurements of the first position sensor and the second position sensor, and wherein the light communication device is configured to evaluate the measurements and determine alignment of the light assembly based on predefined tolerance thresholds for the geographical direction and tilt angle.

16 Claims, 3 Drawing Sheets

(56) References Cited

U.S. PATENT DOCUMENTS

| | | | | |
|---|---|---|---|---|
| 6,807,740 | B2 * | 10/2004 | Reed | G01C 15/006 |
| | | | | 33/286 |
| 7,123,165 | B2 * | 10/2006 | Davenport | G01J 1/42 |
| | | | | 246/473 R |
| 7,554,457 | B2 * | 6/2009 | Hounschell, II | B61L 5/1863 |
| | | | | 246/127 |
| 8,149,129 | B2 * | 4/2012 | Ballinger | B61L 29/30 |
| | | | | 340/687 |
| 2004/0119587 | A1 | 6/2004 | Davenport et al. | |
| 2005/0237215 | A1 | 10/2005 | Hatfield et al. | |
| 2006/0017583 | A1 | 1/2006 | Davenport et al. | |
| 2007/0180719 | A1 * | 8/2007 | Donnelly | B60S 9/02 |
| | | | | 33/366.11 |
| 2008/0288170 | A1 | 11/2008 | Ruggiero | |
| 2008/0296442 | A1 * | 12/2008 | Ruggiero | B61L 29/30 |
| | | | | 246/473.1 |
| 2021/0086811 | A1 * | 3/2021 | Fox | G01J 1/0219 |

* cited by examiner

SYSTEM AND METHOD FOR DETERMINING ALIGNMENT FOR RAILWAY WAYSIDE SIGNAL APPLICATIONS

BACKGROUND

1. Field

Aspects of the present disclosure generally relate to a system and method for determining alignment for a utility, such as a signaling unit mounted for example to an end of a post or mast. Specifically, the system and method are for use in a railway setting, for determining alignment of railway signals that are positioned to side(s) of railway tracks and provide signals to intended observers, such as for example train operators or motorists. It will be appreciated that the present disclosure will have wider applicability and, for example, is be applicable to many forms of post mounted lighting, signaling or other utility.

2. Description of the Related Art

The railroad industry, including but not limited to the freight railroad industry, employs wayside signals such as for example signal lights to inform train operators of various types of operational parameters. For example, colored wayside signal lights are often used to inform a train operator as to whether and how a train may enter a block of track associated with the wayside signal light. Another example is a grade crossing warning device which is a device that warns of the approach of a train at a grade crossing, examples of which include crossing gate arms, crossing lights (such as the red flashing lights often found at highway grade crossings in conjunction with the crossing gate arms), and/or crossing bells or other audio alarm devices.

Regarding crossing lights, herein also referred to crossing lamps, per the Federal Railroad Administration (FRA), proper alignment of lamps is essential. The lamp(s) must be precisely aligned to direct a narrow intense beam toward approaching motorist(s). For example, a flashing light unit on the right-hand side of a highway or road is usually aligned to cover a distance far from the grade crossing. Hence, periodic alignment checks are required by the FRA. Crossing lamp alignment checks are performed for example by maintenance personnel going to specific focal points of the lamps and confirming proper alignment. Each lamp has a specific focal point at various location(s), and it involves activating the crossing lamp and walking to the location as traffic permits. Thus, a technique to automate this process may result in a substantial labor reduction. Additionally, allowing immediate detection if a lamp falls significantly out of alignment reduces exposure of the motorist to a hazard.

SUMMARY

A first aspect of the present disclosure provides a system for determining alignment of a signal comprising a light assembly comprising a light source and operated by an electronic circuit, a first position sensor configured to measure a geographical direction of the light assembly, a second position sensor configured to measure a tilt angle of the light assembly, and a light communication device configured to receive measurements of the first position sensor and the second position sensor, and wherein the light communication device is configured to evaluate the measurements and determine alignment of the light assembly based on predefined tolerance thresholds for the geographical direction and tilt angle.

A second aspect of the present disclosure provides a method for determining alignment of a signal comprising measuring a geographical direction of a light assembly by a first position sensor, measuring a tilt angle of the light assembly by a second position sensor, transmitting measurements of the first and second position sensors to a light communication device, and evaluating, by the light communication device, the measurements and determining alignment of the light assembly based on predefined tolerance thresholds for the geographical direction and tilt angle.

DETAILED DESCRIPTION

To facilitate an understanding of embodiments, principles, and features of the present disclosure, they are explained hereinafter with reference to implementation in illustrative embodiments. In particular, they are described in the context of a system and a method for determining alignment of a railway wayside signal assembly. Embodiments of the present disclosure, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
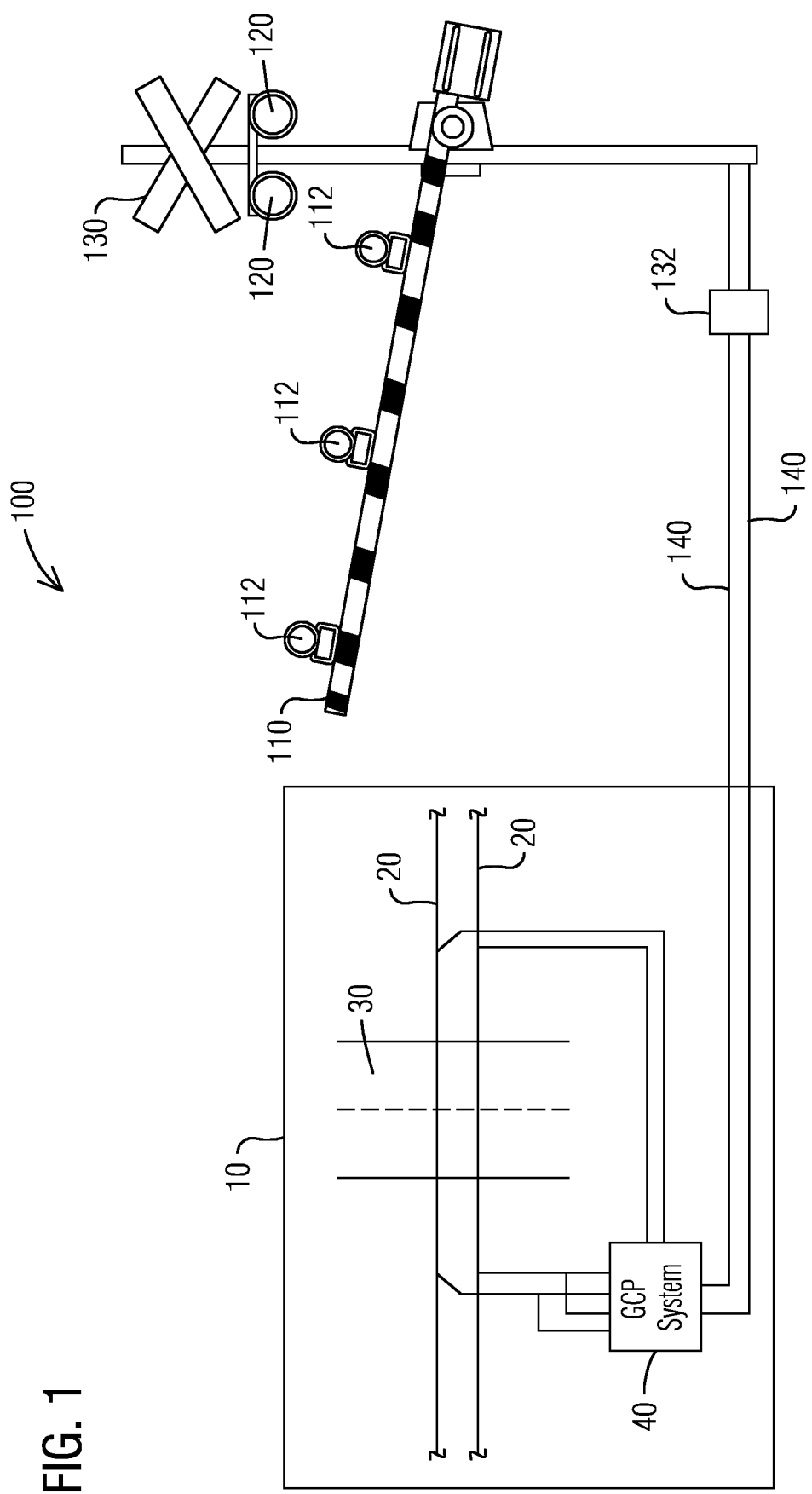
FIG. 1 illustrates a schematic of a railroad crossing in accordance with an exemplary embodiment of the present disclosure.

FIG. 1 illustrates a schematic of a railroad grade crossing 100 in accordance with an exemplary embodiment of the present disclosure. The railroad grade crossing 100 is provided at a location in which a road 30 crosses a railroad track 20.

FIG. 1 illustrates multiple railroad crossing warning devices, also referred to as grade crossing warning devices, which warn of the approach of a train at the crossing of the road 30 and the railroad track 20, i.e., a railroad crossing. The railroad crossing warning devices include for example a crossing gate arm 110 with (or without) gate arm lights 112 spaced along the arm 110, crossing lamps (or lights) 120, a railroad crossbuck 130, and/or other devices not illustrated herein, as for example crossing bells or other audio alarm devices. The crossing warning devices are in communication with a grade crossing predictor (GCP) system 40 via connecting elements 140, which are for example electric cables. It should be noted that the components are illustrated schematically and are not drawn to scale, in particular are not drawn to scale in relation to each other.

The GCP system 40 is configured to detect the presence of an approaching train, determine its speed and distance from the railroad crossing, calculates when the train will arrive at the crossing, and will use this information to generate constant warning time signals for controlling the crossing warning devices 110, 112, 120, 130. Typically, a crossing controller, which can be for example a normally energized master relay 132, only shown schematically herein, is arranged between the GCP system 40 and the warning devices 110, 112, 120, 130, for example along the connecting elements 140 and operably coupled by the connecting elements 140, wherein an output of the GCP system 40 feeds a coil of the master relay 132. According to a pre-programmed time, for example a number of seconds and/or minutes, before projected arrival time of the approaching train, the GCP system 40 is configured such that the output feeding the coil of the master relay 132 is turned off to drop the master relay 132 and to activate the crossing warning devices 110, 212, 120, 130. Other configurations of a crossing controller are possible. It should be noted that the GCP system 40, the master relay 132 (crossing controller) and the warning time devices 110, 112, 120, 130 will not be described in further detail as those of ordinary skill in the art are familiar with these devices and systems.

Figure 2:
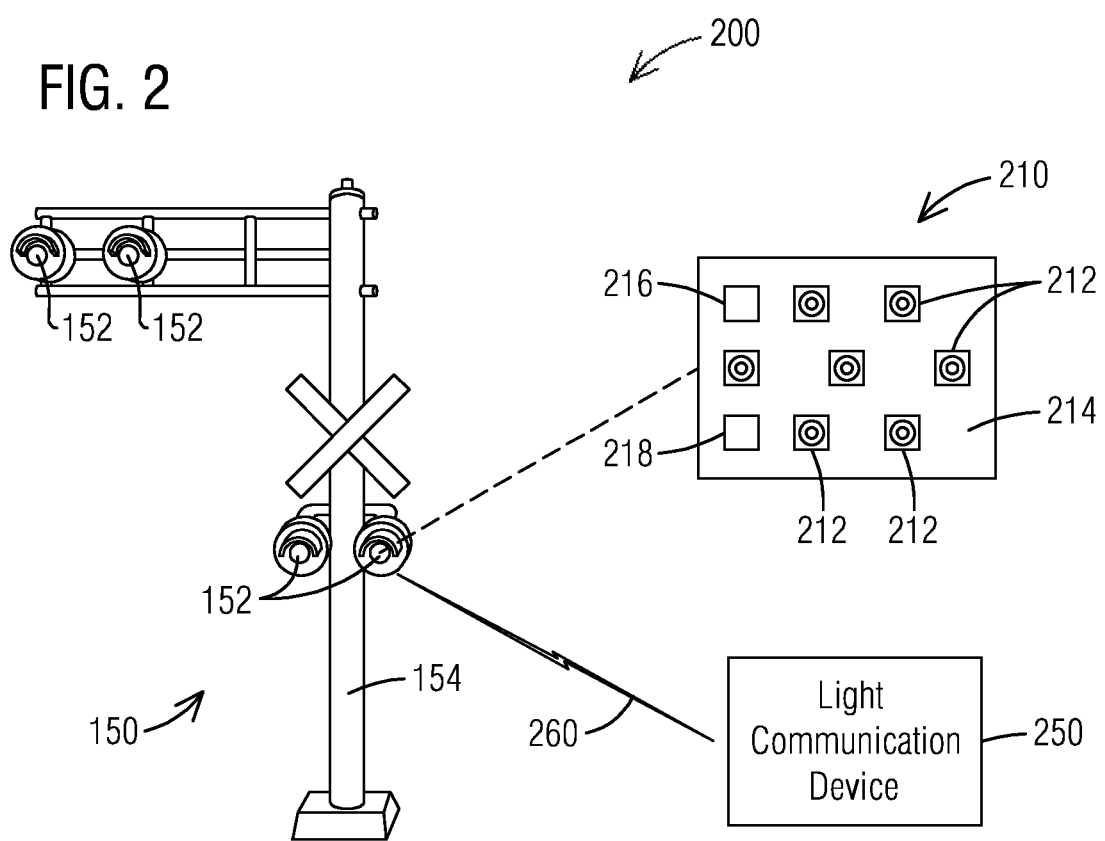
FIG. 2 illustrates a schematic of a system for determining alignment of a signal in accordance with an exemplary embodiment of the present disclosure.

FIG. 2 illustrates a schematic of a system 200 for determining alignment of a signal in accordance with an exemplary embodiment of the present disclosure. The system 200 for determining alignment of a signal is herein also referred to as simply alignment system 200.

The alignment system 200 can be used in a railroad crossing warning system, for example in connection with railroad crossing warning device 150 comprising multiple crossing lights 152. However, it should be noted that the described alignment system 200 can be used not only for railroad crossing warning devices, but for many other light or lamp applications, for example road traffic or warning lights, within industrial facilities, airport facilities or within building technology applications.

The alignment system 200 can be used for a light assembly 210 for one or more of the crossing lights 152. The light assembly 210 comprises a light source 212 coupled to a base 214. The light source 212 is operated by an electronic circuit and is flashed by a crossing controller in connection with a GCP providing control signals to the light assembly 210.

In an embodiment, the light source 212 comprises at least one light emitting diode (LED) and the base 214 comprises a LED printed circuit board (PCB). Using one or more LEDs provides smart and low power lamps. The light source 212 and base 214 are positioned in a housing or an enclosure.

In the example as illustrated in FIG. 2, the light assembly 210 comprises a plurality of LEDs, in particular a center LED and multiple outer LEDs, the LEDs providing the light source 212. The outer LEDs include six LEDs arranged around the center LED with equal distances to each other. Such a configuration may also be referred to as hexapolar configuration. The LEDs are arranged on and supported by a printed circuit board (PCB), which provides base 214. Of course, the PCB can comprise many other electronic components, such as for example LED driver units, processing units, and/or optical detectors for monitoring the LEDs. The LEDs can be for example LEDs with integrated lenses, but many other LED types such as pure chips or packages without lenses can be used. Also, many other configurations for LEDs may be used.

Alternatively, the light source 212 can comprise one or more incandescent light bulb(s) with corresponding base(s). Thus, existing devices with incandescent light bulbs can be retrofitted to achieve or accomplish the light assembly 210.

As described before, the FRA requires proper alignment of lamps or lights, such as crossing lights 152. The lamp(s) must be precisely aligned to direct a narrow intense beam toward approaching motorist(s). Each light has a specific focal point at various location(s). For example, a flashing light unit on the right-hand side of a highway or road is usually aligned to cover a distance far from the grade crossing.

In accordance with an exemplary embodiment, an automated system and method for determining alignment of a signal, such as light assembly 210 for crossing lights 152, is provided. A first position sensor 216 is configured to measure a geographical direction of the light assembly 210, and a second position sensor 218 is configured to measure a tilt (angle) of the light assembly 210.

The position sensors 216, 218 can be mounted in an enclosure of the crossing light 152 or can be arranged and/or mounted on the LED PCB, as shown in FIG. 2. In case of incandescent light bulb(s), the position sensors 216, 218 can be arranged or positioned in a lamp enclosure or housing of crossing light 152.

A geographical direction of the light assembly 210 (or generally a crossing light 152) refers to north (N), east (E), south (S) and west (W). Thus, the first position sensor 216 determines/measures the geographical direction (orientation) N, E, S, W of the light assembly 210, see also FIG. 3.

The second position sensor 218 measures or determines tilt or a tilt angle of the light assembly 210. Tilt measurements provide whether the light assembly 210/crossing light 152 is pointing up versus down. Tilt angle $\alpha$ as used herein refers to the angle between two planes that intersect, for example a horizontal plane and the light assembly's plane, measured in degrees or radians, see also FIG. 4.

In an exemplary embodiment, the first position sensor 216 comprises a magnetometer or magnetometer sensor. A magnetometer is a device that measures magnetism. Examples for a magnetometer include a compass which measures the direction of the Earth's magnetic field. The position sensor 216 may include a magnetometer sensor that utilizes solid state technology to create a miniature Hall-effect sensor that detects the Earth's magnetic field along three perpendicular axes X, Y and Z.

In an exemplary embodiment, the second position sensor 218 comprises an accelerometer or accelerometer sensor. An accelerometer measures acceleration due to movement and gravity. An accelerometer can be used to calculate a tilt angle when the accelerometer is static and not moving.

The position sensors 216, 218 can be separate components, as illustrated in FIG. 2, or the position sensors 216, 218 can be integrated or combined in one sensor device.

The alignment system 200 further comprises a light communication device 250 configured to receive measurements of the first position sensor 216 and the second position sensor 218. The light communication device 250 is further configured to evaluate the measurements and determine alignment of the light assembly 210 based on predefined tolerance thresholds for the geographical directions N, E, S, W and tilt angle $\alpha$.

The light communication device 250 and crossing light 152 comprising light assembly 210 with position sensors 216, 218 communicate via a communication link 260, the communication link 260 being adapted for wireless communication. In an example, the crossing light 152 transmit measurements wirelessly to the light communication device 250, for example via Bluetooth®, Echelon, Zigbee, radio frequency (RF) such as Ultra-Wide Band (UWB), Internet (Wi-Fi), RF etc. Thus, the crossing light 152 and the light communication device 250 comprise appropriate wireless communication interfaces. Alternatively, if communication is wired, the crossing light 152 can comprise a wired connection to the light communication device 250, for example via cables. The light assembly 210 and/or crossing light 152 comprises at least one processor for processing and communicating the measurements to the light communication device 250.

The light communication device 250 is configured to generate an alarm when at least one of the measurements of the first and second position sensors 216, 218 is outside the predefined tolerance thresholds.

For example, a crossing light 152 is supposed to be arranged in geographical direction facing NE, 40°, and with a tilt angle α of −5°. A predefined tolerance threshold may be defined as NE, between 39° and 41°, and tilt angle α between −4.5° and −5.5°. When one of the measurements is outside the tolerance thresholds, for example the tilt angle α is −6°, the light communication device 250 generates an alarm or message or other signal that the respective crossing light 152 needs re-alignment to conform with FRA regulations.

In another exemplary embodiment, the alignment system 200 comprises a pre-emptive correction mode. A pre-emptive correction mode can indicate whether a crossing light 152 moves toward misalignment or has a tendency that indicates misalignment. Specifically, the light communication device 250 can be configured to recognize or identify a trend of misalignment, and issue or generate corresponding signals or messages.

In an example, a crossing light 152 comprises a proper tilt angle α of −5°, with predefined tolerance thresholds of between −4.5° and −5.5°. A first measurement by the second position sensors 218 (tilt sensor) provides a tilt angle of −4.9°, and a second later measurement provides a tilt angle of −4.8°. The light communication device 250 does not yet issue alarms or message for re-alignment of the crossing light 152, because the measurements are still within the predefined tolerance band of −4.5° and −5.5°. However, a trend or tendency toward misalignment is identifiable. Specifically, the light communication device 250, receiving the measurements, is configured to identify or determine a trend or tendency of misalignment and may be further configured to provide a corresponding message or signal. For example, a color scheme with respect to (mis)-alignment may be provided. For example, proper alignment of a crossing light 152 may be indicated by green, misalignment within the predefined tolerance thresholds may be indicated by yellow, and misalignment outside the predefined tolerance threshold may be indicated by red. In our example, the light communication device 250 may issue a yellow color signal, informing for example maintenance personnel that a specific crossing light needs to be re-aligned soon. In this case, the respective crossing light may be re-aligned preemptively, instead of when the crossing light is misaligned outside the tolerance thresholds which may cause an urgent re-alignment request for the maintenance personnel.

The light communication device 250 may be embodied as software or a combination of software and hardware. The light communication device 250 may be an existing device programmed to interact with the light assembly 210/crossing light 152. For example, the light communication device 250 may be incorporated into an existing wayside control device, for example constant warning device or crossing controller, by means of software. The light communication device 250 may be a module programmed into an existing crossing controller.

For example, a crossing bungalow, which is typically located close to a railroad grade crossing, may house the light communication device 250. The crossing bungalow typically includes equipment and devices necessary for controlling a grade crossing, such as for example GCP and crossing controller. An antenna, for example mounted on the crossing bungalow if the light communication device 250 is in the crossing bungalow, can be used for a wireless communication between the light communication device 250 and light assembly 210. Alternatively, the light communication device 250 may be located remotely to the grade crossing, for example at a central train operator station or a rail operations center.

Typically, a grade crossing and/or crossing warning devices comprise multiple light assemblies 210/crossing lights 152, wherein each crossing light 152 can be configured to comprise the position sensors 216, 218. Multiple position sensors 216, 218 can communicate with the light communication device 250 which is configured to receive the measurements of the multiple position sensors 216, 218.

In an embodiment, the first and second position sensors 216, 218 are powered by the electronic circuit that operates the light source 212. That means that when the light source 212 is operated and activated for flashing, the position sensors 216, 218 receive electrical energy. The position sensors 216, 218 can be configured so that when the position sensors 216, 218 receive electrical energy due to activation of the light source 212, they also perform measurements. Measurements can be transmitted to the light communication device 250 periodically (in certain intervals) or immediately after measurements have been performed.

In addition, or alternatively, the light assembly 210 or crossing light 152 comprise a power reservoir, such as a capacitor, supercapacitor or ultracapacitor, for storing electrical energy. Such electrical energy may be received by the electronic circuit operating the light source 212 and stored in the energy reservoir. In this case, measurements may be performed by the position sensors 216, 218 at specific times, which may or may not be when the respective crossing light 152 is activated. For example, the position sensors 216, 218 may perform measurements at 24h intervals. The position sensors 216, 218 can be activated to perform measurements for example by at least one processor, such as a microprocessor. The at least one processor activating the position sensors 216, 218 can be the same processor that initiates transmission of the measurements to the light communication device 250.

In an embodiment, the measurements by the position sensors 216, 218 and evaluated by the light communication device 250, and/or alarm(s), message(s), or signal(s) generated by the light communication device 250 are provided to or accessible via a mobile application. Such a mobile application may be installed in a handheld device, such as smart phone, tablet etc. Maintenance or service personnel of the railroad operator may retrieve the data and information via the mobile application and can re-align out of line railway signals.

Figure 3:
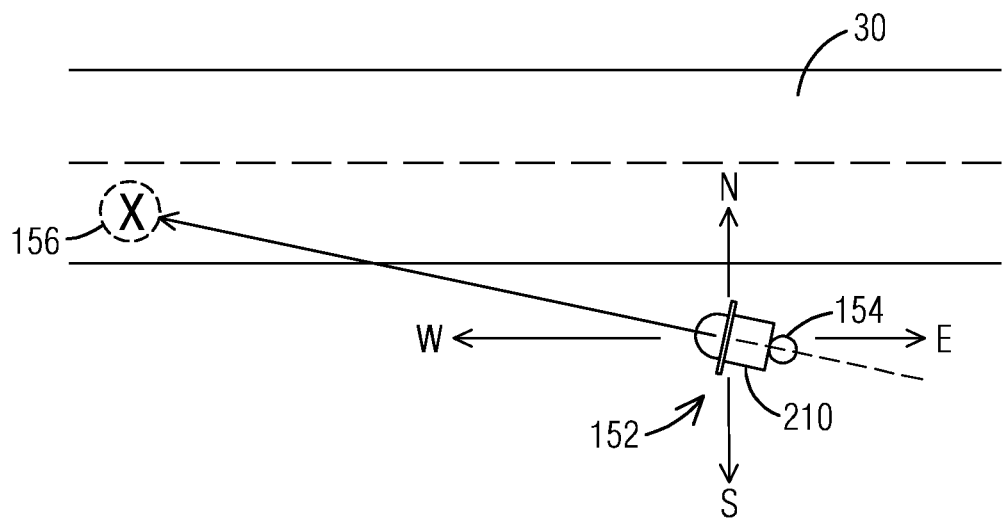
FIG. 3 illustrates a schematic of a light assembly arranged in a specific geographical direction in accordance with an exemplary embodiment of the present disclosure.

FIG. 3 depicts a schematic of a light assembly 210 arranged in a specific geographical direction in accordance with an exemplary embodiment of the present disclosure. The light assembly 210 of crossing light 152 is arranged at a right-hand side of the road 30 and warns of the approach of a train. The crossing light 152 is mounted to post 154, for example to an end of the post 154.

As described before, the FRA requires proper alignment of lamps or lights, such as crossing lights 152. The lamp(s) must be precisely aligned to direct a narrow intense beam toward approaching motorist(s). Each light has a specific focal point at various location(s). The crossing light 152 has focal point or adjustment target 156 located at the road 30 intended for motorists travelling on the road 30.

The crossing light 152 comprises position sensor 216 configured to measure the geographical direction of the light assembly 210. The geographical direction of the light assembly 210 (or generally a crossing light 152) refers to north (N), east (E), south (S) and west (W). The geographical direction of the crossing light 152 with light assembly 210 is indicated by N, E, S and W. Thus, the first position sensor 216 determines/measures the geographical direction (orientation) N, E, S, W of the light assembly 210.

In an exemplary embodiment, the first position sensor 216 comprises a magnetometer or magnetometer sensor, such as for example a 3-dimensional (3D) magnetometer and measures the direction of the Earth's magnetic field. In the example of FIG. 3, the first position sensor 216 measures or determines that the crossing light 152 is arranged in geographical direction facing NW, about for example 360°.

Figure 4:
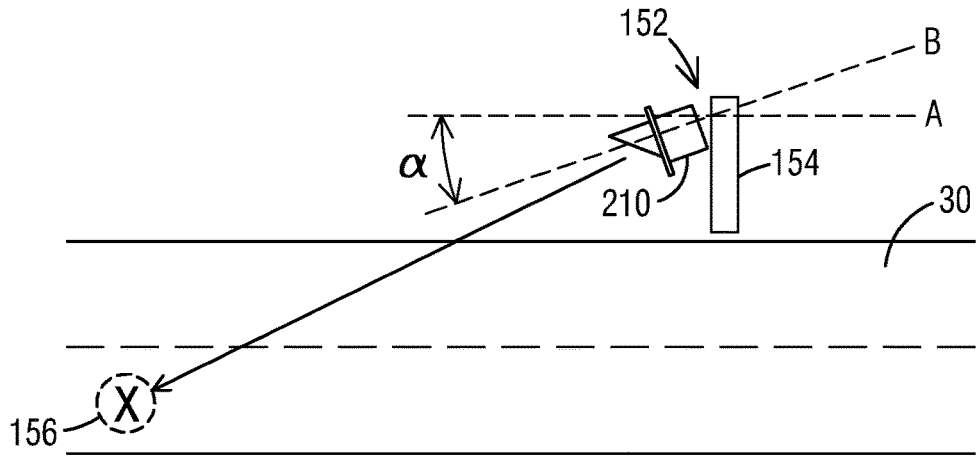
FIG. 4 illustrates a schematic of a light assembly arranged with a specific tilt in accordance with an exemplary embodiment of the present disclosure.

FIG. 4 depicts a schematic of a light assembly 210 in a specific tilted arrangement in accordance with an exemplary embodiment of the present disclosure. The light assembly 210 of crossing light 152 is arranged at a side of the road 30 and warns of the approach of a train. The crossing light 152 is mounted to post 154. The crossing light 152 has focal point or adjustment target 156 located at the road 30 intended for motorists travelling on the road 30.

The light assembly 210 comprises a second position sensor 218 which is configured to measure or determine vertical alignment of the crossing light 152, for example tilt angle $\alpha$. The second position sensor 218 may comprise a 3-dimensional (3D) accelerometer for measuring the vertical alignment via tilt angle $\alpha$ of the crossing light 152. Tilt angle $\alpha$ as used herein refers to the angle between two planes that intersect, for example horizontal plane A and the light assembly's plane B, measured in degrees or radians. Tilt angle $\alpha$ may be positive or negative. For example, when the light assembly 210 points up, the tilt angle may be positive and when the light assembly points down, the tilt angle may be negative. In our example of FIG. 4, the tilt angle $\alpha$ may be about −10°.

Figure 5:
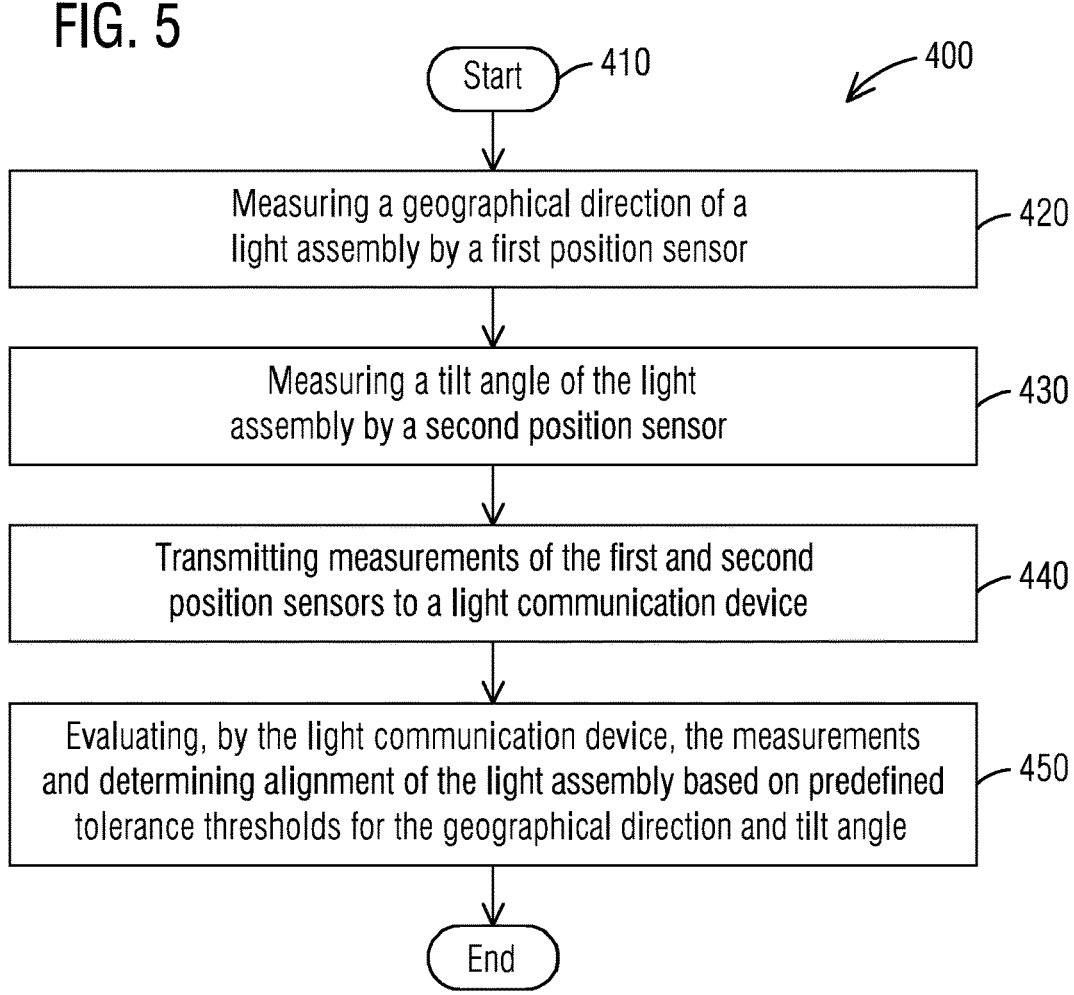
FIG. 5 illustrates a flow chart of a method for determining alignment of a signal in accordance with an exemplary embodiment of the present disclosure.

FIG. 5 depicts a flow chart of a method 400 for determining alignment of a signal, such as for example a crossing light, see FIG. 1, FIG. 2, FIG. 3 or FIG. 4. The process or method 400 can be implemented by using any of the features, components, or devices discussed herein, or any combination of them. The method 400 is performed, for example, by an alignment system 200 as disclosed herein. While the method 400 is described as a series of acts that are performed in a sequence, it is to be understood that the method 400 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method 400 may start at 410 and may include an act 420 of measuring a geographical direction of a light assembly 410 by a first position sensor 216. The method 400 may also include an act 430 of measuring a tilt angle $\alpha$ of the light assembly 210 by a second position sensor 218, and an act 440 of transmitting measurements of the first and second position sensors 216, 218 to a light communication device 250.

The method may further comprise act 450 of evaluating, by the light communication device 250, the measurements and determining alignment of the light assembly 210 based on predefined tolerance thresholds for the geographical direction and tilt angle $\alpha$. At 460, the method 400 may end.

It should be appreciated that the described method 400 may include additional acts and/or alternative acts corresponding to features described with respect to the alignment system 200, see for example FIG. 1, FIG. 2, FIG. 3 and FIG. 4.

In an embodiment, the method 400 further comprises generating, by the light communication device 250, an alarm or message or signal when at least one of the measurements is outside the predefined tolerance thresholds. In another embodiment, the method 400 further comprises powering the first and second position sensors 216, 218 by an electronic circuit, the electronic circuit operating a light source 212 of the light assembly 210. In another embodiment, the method 400 further comprises performing, by the first and second position sensors 216, 218, measurements when the light source 212 is activated by the electronic circuit.

In another embodiment, the method 400 comprises determining, by the light communication device 250, a trend or tendency toward misalignment when at least one of the measurements deviates from a predefined geographical position or tilt angle within the predefined tolerance thresholds, and generating, by the light communication device 250, a message or signal that indicates the trend or tendency toward misalignment.

In another embodiment, the method 400 comprises providing the measurements of the first and second position sensors 216, 218 and/or the alarm(s) or message(s) or signal(s) generated by the light communication device 250 via a mobile application to an end user. A mobile application itself may generate alarm(s), message(s) or signal(s) based on measurements transmitted by the light communication device 250, directly or indirectly to the mobile application.

It should be appreciated that acts associated with the above-described methodologies, features, and functions (other than any described manual acts) may be carried out by one or more data processing systems, via operation of at least one processor. For example, light communication device 250 may comprise at least one processor.

As used herein, a processor corresponds to any electronic device that is configured via hardware circuits, software, and/or firmware to process data. For example, processors described herein may correspond to one or more (or a combination) of a microprocessor, central processing unit (CPU) or any other integrated circuit (IC) or other type of circuit that is capable of processing data in a data processing system.

In addition, it should also be understood that a processor that is described or claimed as being configured to carry out a particular described/claimed process or function may correspond to the combination of the processor with the executable instructions (e.g., software/firmware apps) loaded/installed into a memory (volatile and/or non-volatile), which are currently being executed and/or are available to be executed by the processor to cause the processor to carry out the described/claimed process or function. Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/claimed processor that is configured to carry out the particular processes and functions described/claimed herein.

In addition, it should be understood, that reference to "a processor" may include multiple physical processors or cores that are configures to carry out the functions described herein. Further, it should be appreciated that a data processing system may also be referred to as a controller that is operative to control at least one operation.

The described alignment system 200 and method 400 provide a sensor-based approach for determining alignment of signals, such as railway crossing lights, wherein signal position information is available on command without specific lamp activation, on-site or remotely, periodically or continuously. For example, periodic crossing lamp alignment checks required by the FRA can be performed automatically resulting in labor savings and additionally, if lamps fall out of alignment, alarms are triggered to schedule service based on the severity of the misalignment.

The invention claimed is:

1. A system for determining alignment of a signal comprising:
    a light assembly comprising a light source operated by an electronic circuit,
    a first position sensor configured to measure a geographical direction of the light assembly,
    a second position sensor configured to measure a tilt angle of the light assembly, and
    a light communication device configured to receive measurements of the first position sensor and the second position sensor, and wherein the light communication device is configured to evaluate the measurements and determine alignment of the light assembly based on predefined tolerance thresholds for the geographical direction and tilt angle,
    wherein the first and second position sensors are powered by the electronic circuit operating the light source, and
    wherein the first and second position sensors are configured to receive power and perform measurements when the light source is activated by the electronic circuit.

2. The system of claim 1,
    wherein the light communication device is further configured to generate an alarm or message when at least one of the measurements is outside the predefined tolerance thresholds.

3. The alignment system of claim 2,
    wherein the measurements of the first and second position sensors and/or the alarm generated by the light communication device is provided to or accessible via a mobile application.

4. The system of claim 1,
    wherein the light source comprises at least one light emitting diode (LED) arranged on a printed circuit board (PCB), and
    wherein the first and second position sensors are arranged on the PCB.

5. The system of claim 1,
    wherein the light source comprises at least one incandescent light bulb positioned in an enclosure, and
    wherein the first and second position sensors are positioned in the enclosure.

6. The system of claim 1,
    wherein the first position sensor comprises a magnetometer.

7. The system of claim 1,
    wherein the second position sensor comprises an accelerometer.

8. The alignment system of claim 1,
    wherein the light communication device is integrated in a grade crossing predictor, and
    wherein the first and second position sensor are configured to transmit measurements to the grade crossing predictor.

9. The system of claim 1, further comprising:
    a capacitor for storing electrical energy received via the electronic circuit, wherein the capacitor provides the electrical energy to the first and second position sensors.

10. A railway wayside signal assembly comprising:
    a post or mast for installing along a railway track, and
    a system for determining alignment of a signal as claimed in claim 1, the signal being mounted to the post or mast.

11. A method for determining alignment of a signal comprising:
    measuring a geographical direction of a light assembly by a first position sensor,
    measuring a tilt angle of the light assembly by a second position sensor,
    transmitting measurements of the first and second position sensors to a light communication device, and
    evaluating, by the light communication device, the measurements and determining alignment of the light assembly based on predefined tolerance thresholds for the geographical direction and tilt angle,
    powering the first and second position sensors by an electronic circuit, the electronic circuit operating a light source of the light assembly, and
    performing measurements by the first and second position sensors when the light source is activated by the electronic circuit.

12. The method of claim 11, further comprising:
    generating, by the light communication device, an alarm or message or signal when at least one of the measurements is outside the predefined tolerance thresholds.

13. The method of claim 12, further comprising:
    providing the measurements of the first and second position sensors and/or the alarm or message or signal generated by the light communication device via a mobile application to an end user.

14. The method of claim 11, further comprising:
    determining, by the light communication device, a trend or tendency toward misalignment when at least one of the measurements deviates from a predefined geographical position or tilt angle within the predefined tolerance thresholds, and
    generating, by the light communication device, a message or signal that indicates the trend or tendency toward misalignment.

15. The method of claim 11,
    wherein the first position sensor comprises a magnetometer, and
    wherein the second position sensor comprises an accelerometer.

16. The method of claim 11,
    wherein the light assembly is part of a railway wayside signal including a crossing light.

* * * * *